US007469324B2

(12) United States Patent
Tene et al.

(10) Patent No.: US 7,469,324 B2

(45) Date of Patent: Dec. 23, 2008

(54) SYSTEM AND METHOD FOR CONCURRENT COMPACTING SELF PACING GARBAGE COLLECTION USING LOADED VALUE AND ACCESS BARRIERS

(75) Inventors: Gil Tene, San Carlos, CA (US); Michael A. Wolf, San Francisco, CA (US)

(73) Assignee: Azul Systems, Inc., Mountain View, CA (US)

( * ) Notice: Subject to any disclaimer, the term of this patent is extended or adjusted under 35 U.S.C. 154(b) by 389 days.

(21) Appl. No.: 11/031,015

(22) Filed: Jan. 7, 2005

(65) Prior Publication Data

US 2006/0155791 A1 Jul. 13, 2006

(51) Int. Cl.
*G06F 12/00* (2006.01)

(52) U.S. Cl. ....................... 711/159; 711/133; 711/154; 711/170; 707/206

(58) Field of Classification Search ................. 711/159, 711/154, 133, 170; 707/206
See application file for complete search history.

(56) References Cited

U.S. PATENT DOCUMENTS 6,249,793 B1 6/2001 Printezis et al.
6,502,111 B1 12/2002 Dussud
6,584,478 B1 * 6/2003 Spertus ....................... 707/206
7,051,056 B2 * 5/2006 Rodriguez-Rivera et al. ..... 707/206
7,197,521 B2 * 3/2007 Subramoney et al. ....... 707/206

OTHER PUBLICATIONS

Yamamoto et al., "Distributed Persistent Object System with Uniform Representation of Pointers and Its Garbage Collection," pp. 12-21, IEEE, Jan. 1996.*

Hallenberg et al., "Combining Region Inference and Garbage Collection," pp. 141-152, ACM, Jun. 2002.*

* cited by examiner

*Primary Examiner*—Stephen Elmore
(74) *Attorney, Agent, or Firm*—Van Pelt, Yi & James LLP

(57) ABSTRACT

A method, system, and computer program product for managing a heap of memory allocated to a program being executed on a data processing system is disclosed. A limited amount of memory is allocated to a program being executed by a mutator on a data processing system. The memory comprises memory objects. The disclosed method identifies memory objects, which are allocated to the program but are not referenced anymore. These dead memory objects are freed and made available for further allocation in the program. The memory objects that are still referenced are organized in compact contiguous blocks. Thus, the disclosed method recycles memory allocated to the program. The disclosed method is executed iteratively and concurrently with the execution of the program. The disclosed method does not interfere with program execution. Amount of memory required is specified before the commencement of the disclosed method and the same amount is freed without any surplus.

35 Claims, 9 Drawing Sheets

| 802 | 804 | 806 | 808 | 810 | 812 | 814 | 816 | 818 | 820 |
|---|---|---|---|---|---|---|---|---|---|
| Object | Object-Bit | Start | First Mark-Remap Phase | First Relocation Phase | Second Mark-Remap Phase | Second Relocation Phase | Third Mark-Remap Phase | Third Relocatio n Phase | Fourth Mark-Remap Phase |
| A | A.mark | 0 | 1 | 1 | 0 | 0 | 1 | 1 | 0 |
| | A.x.refmark | 0 | 1 | 1 | 0 | 0 | 1 | 1 | 0 |
| | A.y.refmark | 0 | 1 | 1 | 0 | 0 | 1 | 1 | 0 |
| B | B.mark | 0 | 1 | 1 | 0 | 0 (Rel) | 1 | 1 | 0 |
| C | C.mark | 0 | 1 | 1 | 0 | 0 (Rel) | 1 | 1 | 0 |
| | C.x.refmark | | 1 | 1 | 0 | 0 (Rel) | 1 | 1 | 0 |
| D | D.mark | 0 | 0 | 0 | 0 | 0 | 0 | 0 (F-S) | X |
| | D.x.refmark | | 0 | 0 | 0 | 0 | 0 | 0 (F-S) | X |
| E | E.mark | 0 | 0 | 1 | 1 | 1 (F-S) | X | X | X |
| | E.x.refmark | | 0 | 0 | 0 | 0 (F-S) | X | X | X |
| 822 Mark Bit indicating LIVE | | 0 | 1 | 1 | 0 | 0 | 1 | 1 | 0 |
| 824 Reference Mark Bit indicating MARKED THROUGH | | 0 | 1 | 1 | 0 | 0 | 1 | 1 | 0 |

FIG. 8

SYSTEM AND METHOD FOR CONCURRENT COMPACTING SELF PACING GARBAGE COLLECTION USING LOADED VALUE AND ACCESS BARRIERS

BACKGROUND

The present invention relates to the field of memory management in computer programming. In particular, the present invention deals with garbage collection during computer programming.

A computer system has a limited amount of memory that is primarily used by a number of software programs or applications that run on the computer system. It is imperative that a program use the limited memory allocated to it very judiciously and efficiently. A non-judicious use of the allocated limited memory can result in memory overruns and greater time-consumption in program execution. Most programs involve allocation of memory locations or objects based upon current requirements or demands by the various operations in a program. For example, a word processor would have to allocate a memory object for a table of data created by the user. Memory objects are memory locations that are well defined in terms of size, type, and structure. As the program executes, the memory requirements of various operations of the program change. The change in run-time memory requirement is addressed by dynamic memory management, which can be done manually or automatically.

Manual memory management requires the programmer to allocate memory objects at appropriate places in the program code. The programmer also has to free the allocated memory objects if they are no longer in use. Various programming languages allow programmers to allocate and de-allocate memory manually. For example, in the C language the function malloc( ) allocates memory while free( ) frees up the allocated memory. Though it provides the programmer with flexibility, manual memory management is feasible primarily for small programs. In case of larger programs, manual memory management becomes progressively difficult and can lead to errors. For example, a memory object can be de-allocated while it is still being referenced in other parts of the program. On the other hand, unused or dead memory objects might not be de-allocated leading to a lot of dead memory objects occupying the memory space. Attempts to correct any of the above two errors would add to the complexity of the program and may cause another error.

Automatic memory management, also known as garbage collection, on the other hand, relieves the programmer of most of the worries of memory management. It dispenses with the need for a programmer to de-allocate memory in the program code and hence, avoids almost all the errors caused by manual memory management. Automatic memory management or garbage collection involves techniques that recycle unused memory objects. A code for garbage collection typically includes a mutator and a collector. The part of the code that executes the user code is called the mutator and the part that executes garbage collection is called the collector or garbage collector. The mutator and the collector can be mutually exclusive threads or can be interleaved in the same thread.

At the beginning of the garbage collection process, the collector receives a root set from the mutator. The root set is a collection of roots of the memory objects. A root of a memory object holds a set of references to that memory object. The set of references comprises references in registers of the mutator thread executing the program, all static references, and references to the memory object from any other memory location outside the allocated memory. Generally, the garbage collector carries out garbage collection in two phases. In the first phase, it identifies unused memory objects or garbage. Various techniques are used to identify unused objects. For example, an object that has not been referenced can be termed as dead or unused. In the second phase, the garbage collector carries out relocation of memory objects in such a manner that the unused memory objects are available for use by the same program. A garbage collection process running concurrently with the execution of the program can satisfy the memory requirements dynamically.

It is desirable that during a garbage collection process, memory objects that are made available for re-use are in contiguous memory blocks. If the freed objects are not contiguous, the reallocation of these objects may not be possible if there is a requirement for a larger contiguous block. Further, it is also desirable that the freeing up and reallocation of memory objects happen concurrently with program execution. Ideally, a garbage collection process should address these two requirements.

A number of garbage collection methods are currently being used for memory management. One method of garbage collection is reference counting. In this method, a count is kept of the number of references to a memory object. If the count of references becomes zero, the object is termed as dead or unused. The object is then reallocated. Another method of garbage collection is the Mark-Sweep method. In this method, a given subset of memory is traversed and all the live objects are marked. A live object is defined as an object that is currently in use or which is currently referenced. The memory subset is then swept for unmarked objects. These objects are then reallocated.

Another method of automatic memory management is through the copying garbage collection process. In copying garbage collection, all reachable or referenced objects are copied to a new location. The objects, which are left behind in the old location, are termed as dead and are reallocated. Another method of garbage collection is generational garbage collection. This method uses the generational hypothesis, which states that newer objects are more likely to have a smaller life than older ones. The method involves gathering objects in generations. The objects are divided into new and old generations. The objects in the new generation are moved to the old generation if they survive for a particular amount of time. The objects in the newer generation are collected periodically to reclaim free memory.

There exist a number of patents pertaining to various garbage collection methods. One such patent is U.S. Pat. No. 6,502,111, titled 'Method and System for Concurrent Garbage Collection'. This patent describes a method for concurrent garbage collection wherein live memory objects are marked concurrently with the execution of the application program. A first marking act is performed using root information while the program executes. The method uses a write watch module to accumulate all the modifications that occur during the concurrent marking act in the memory structure. The logged information in the write watch module is then used to perform a second marking act. The application is paused or stopped to perform the second marking act. The garbage collection is then completed by using various techniques such as sweeping or copying. In this invention, the application is stopped or paused while the collection of garbage is carried out. The memory freed up after garbage collection is not available for reallocation as a contiguous block of memory.

Compaction of the unused memory objects results in the availability of a contiguous block of memory for reallocation.

Compaction of unused memory objects is described in U.S. Pat. No. 6,249,793, titled 'Mostly Concurrent Compaction in a Garbage Collection System'. In compaction, variables containing pointers, which point to objects stored in a selected chunk or subset of memory, are identified and stored in a data structure. Concurrently with these steps, a write barrier marks as 'dirty', the regions of memory in which one or more pointers have been modified by the program. Program execution is then stopped for examination of 'dirty' objects to identify any further variables pointing to objects in the memory subset. The data structure is updated accordingly. The variables in the data structure are examined to determine if they still point to the objects in the memory subset. The variables that continue to do so are modified to point to corresponding locations outside the subset of memory. The objects are then copied to the locations outside of the subset of memory, and the program is restarted. The subset of the memory can now be re-allocated as a contiguous block of memory. Extensive remapping of the objects is required as the objects that are referenced in the program are relocated. This increases the complexity and the time taken for execution of the garbage collection process. In addition, the execution of the application program has to be stopped for relocation of the objects.

Most of the garbage collection techniques, existent in the art, like the Mark-Sweep method, stop or suspend the execution of the program. In processes that are time critical, such stoppages are not desirable. Techniques in the art, like reference counting, segregating unused or dead memory blocks from live memory blocks or memory blocks that are being currently used. However, they do not provide contiguous free memory for further reallocation. The reference counting method also fails to detect circular references, which are references from one object to another and vice-versa. The copying method of garbage collection provides contiguous blocks of free memory, however, the method requires twice the memory be freed up. The copying method also suspends the execution of the program for relatively longer periods. Even generational garbage collection methods that do not stop the execution initially, do suspend the execution for garbage collecting the objects in the final stages of the collection process.

Besides the above-mentioned disadvantages of the existent techniques, none of the existing techniques provide an estimate of the minimum amount of memory that can be freed in a particular iteration of the garbage collection process. Such an estimate can be used to pace the garbage collection process in accordance with the current demand.

Thus, from the above discussion, it is evident that there is a need for a garbage collection system that is highly concurrent with the execution of the program. The garbage collection process should not significantly interfere with the execution of the program. The garbage collection process should be able to provide contiguous free blocks of memory for reallocation. At the same time, it should not require excess memory space itself. The garbage collection process should also be able to pace itself as per the current memory demand.

SUMMARY

An object of the present invention is to manage a heap of memory comprising memory objects allocated to a program being executed in a data processing system.

Another object of the present invention is to recycle the memory objects allocated to the program.

A further object of the present invention is to free dead memory objects and to reclaim them for further allocation in the program.

Another object of the invention is to collect the live memory objects allocated to the program in compact continuous pages.

Yet another object of the invention is to manage the heap of memory allocated to the program concurrently with the execution of the program.

The present invention provides a method for managing the heap of memory space allocated to a program in a data processing system. The program is executed by a mutator in the data processing system. The heap of memory allocated to the program comprises pages. References to the memory objects in these pages are obtained. The method disclosed in the present invention is executed iteratively. In each iteration of the method, the obtained references are traversed.

Live memory objects or memory objects that are reachable are marked as such in each iteration. The memory objects have a mark bit. A mark bit set to LIVE value indicates that the memory object is live or reachable. Each iteration is provided with a from-space by the previous iteration. All the live memory objects in the from-space are relocated to new locations in the memory at the end of the previous iteration. If any references to copies of the memory objects in the from-space exist, then the references are remapped to new locations of the memory objects. Subsequently, the from-space is released. Thereby, the dead or unreachable memory objects are freed up and can be reclaimed for reallocation in the heap of memory allocated to the program. All the references that are traversed are marked as such. The references have reference mark bits which, when set to MARKED THROUGH, indicate that the corresponding reference has been traversed.

Each iteration is also provided with a set of candidate pages by the previous iteration. The candidate pages comprise pages that have the least number of live memory objects. The candidate pages are designated as from-space and protected from mutator access. All memory objects in the new from-space are checked. All the live memory objects in the from-space are relocated to new locations. Forwarding pointers are placed on the copies of the memory objects in the from-space. The from-space with copies of relocated memory objects and forwarding pointers is provided to the next iteration. Further, candidate pages are identified and are provided for usage in the next iteration.

Thus, every iteration of the disclosed method frees up memory objects that are dead or are no longer referenced. These memory objects are then reallocated.

BRIEF DESCRIPTION OF THE DRAWINGS

Various embodiments of the invention will hereinafter be described in conjunction with the appended drawings provided to illustrate and not to limit the invention, wherein like designations denote like elements, and in which:

FIG. 8 shows a state table of various marks at various stages of the disclosed method;

DESCRIPTION OF PREFERRED EMBODIMENTS

Figure 1:
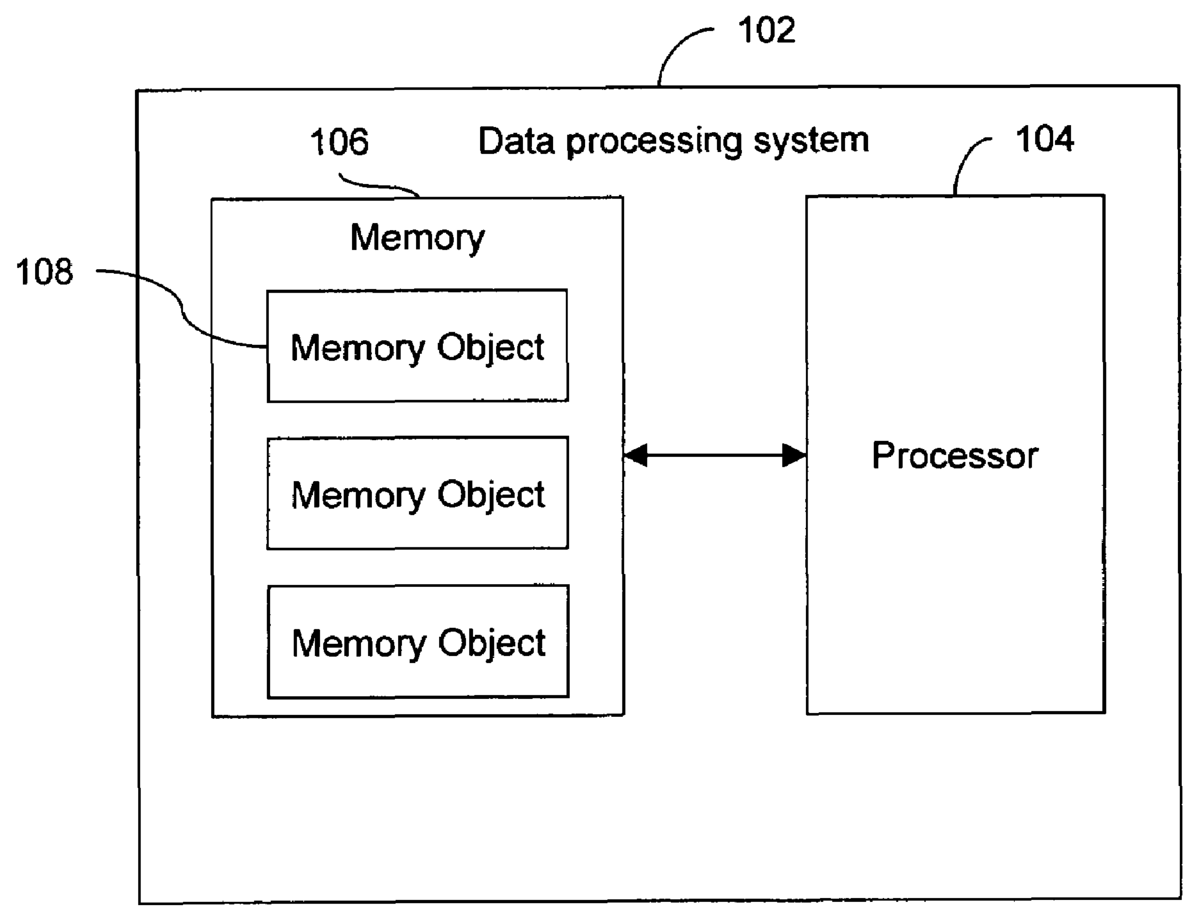
FIG. 1 shows the environment for the implementation of an embodiment of the present invention.

For the sake of convenience, the terms used to describe various embodiments are defined below. It should be understood that these are provided to merely aid the understanding of the description, and that these definitions in no way limit the scope of the invention Definitions Memory: Storage on a data processing system in which data and instructions are stored. Cache and main memory of a data processing system are examples of memory.

Mutator: A program that executes the program on the data processing system.

Collector: A program that executes the program code of the disclosed method in order to free up or collect memory objects.

Iteration: In an iteration, the steps of the disclosed method are executed. The disclosed method is repeatedly executed in a number of iterations.

Memory object: A contiguous block of memory forming a single logical structure.

Heap: A collection of memory objects being managed by the disclosed method. The heap is divided into plurality of pages. Each page includes a plurality of memory objects.

Page: A virtual memory system containing memory objects of fixed size.

Live memory objects: Memory objects that are reachable are termed as live memory objects.

Dead memory objects: Memory objects that are unreachable are termed as dead memory objects Reference: A link from one object to another. Examples of references include pointers.

Page Population Statistics: Page population statistics provide the total number of live objects in a page and total size of live memory objects or population size of the page.

Candidate pages: Pages with least number of live memory objects in an iteration performed by the collector are termed as candidate pages. The candidate pages are identified by using the page population statistics in an iteration of the disclosed method, so that the dead memory objects in the pages can be freed up in the next iteration.

From-space: Candidate pages identified in an iteration of the disclosed method are designated as from-space in the next iteration. All the live memory objects in the from-space are relocated.

Relocation: In relocation, a live memory object in the from-space is copied and is placed in a new location.

Forwarding pointer: When a memory object is relocated out of the from-space, a forwarding pointer is placed on its copy in the from-space. The forwarding pointer provides information about the new location of the memory object for any further referral.

Mark bit: The bit of a memory object that denotes whether the memory object is live or dead is called the mark bit.

Reference mark bit: The bit of a reference that denotes whether the reference has been traversed or not is called the reference mark bit.

LIVE: Binary bit value of the mark bit that signifies that the memory object is live. The value of LIVE is flipped in every iteration. For example, if in an iteration binary bit value '1' signifies LIVE, then in the next iteration, binary bit value '0' signifies LIVE.

DEAD: Binary bit value of the mark bit that signifies that the memory object is DEAD. The value of DEAD is flipped in every iteration. For example, if in an iteration binary bit value '1' signifies DEAD then in the next iteration, binary bit value '0' signifies DEAD.

MARKED THROUGH: Binary bit value of the reference mark bit that signifies that the reference has been traversed and has been marked through. The value of MARKED THROUGH is flipped in every iteration. For example, if in an iteration binary bit value '1' signified MARKED THROUGH then in the next iteration binary bit value '0' signifies MARKED THROUGH.

NOT MARKED THROUGH: Binary bit value of the reference mark bit that signifies that the reference has not been traversed and has not been marked through. The value of NOT MARKED THROUGH is flipped in every iteration. For example, if in an iteration binary bit value '1' signified NOT MARKED THROUGH then in the next iteration binary bit value '0' signifies NOT MARKED THROUGH.

Mutator Invariants: Conditions maintained by the mutator in order to avoid any erroneous operation. For example, the mutator may maintain a mutator invariant to ensure that the mutator does not contain and is unable to load into its registers any references that point to any objects in the from-space during the Mark-remap phase. This ensures that objects in the from-space are not accessed during the Mark-remap phase.

Barriers: The barriers maintain the mutator invariants. The barriers are triggered if any mutator invariant is contradicted.

Barrier handlers: Barrier handlers are program codes that implement the barriers.

Environment of the Invention

Typically, a limited amount of memory is allocated to every program running on a data processing system. This memory comprises memory objects. References to memory objects are created in the program. Roots contain references to memory objects. A memory object referred to by a root or another object is termed as reachable. A program running on the data processing system, called a mutator, executes the program. Different threads of the mutator may execute different programs.

FIG. 1 shows the environment in which a preferred embodiment of the present invention is implemented. The disclosed method operates on a data processing system 102. Data processing system 102 comprises a processor 104 and a memory 106. Processor 104 executes programs coded by a user. Processor 104 also allocates memory objects 108 in memory 106 to each program being executed.

The present invention provides a method, system, and computer program product for the management of a heap of memory allocated to a program being executed on a data processing system (such as a computer). In particular, the present invention offers a highly concurrent, efficient, compacting and self-pacing method for garbage collection. The disclosed method identifies unreachable memory objects and makes them suitable for reallocation by the same program. A program called collector carries out the disclosed method. The collector executes the disclosed method concurrently with the execution of the mutator.

Overview of the Method

At a broad level, the disclosed method comprises two phases: A Mark-remap phase and a Relocation phase. The Mark-remap phase traverses through references, identifies live memory objects, and marks them as LIVE. The Mark-remap phase remaps any reference to existing from-space and releases the from-space, thereby freeing up dead memory objects in the from-space. The Relocation phase creates new from-space. The from-space comprises candidate memory pages identified in the previous iteration. The Relocation phase relocates reachable memory objects in the from-space to their new locations. The Relocation phase also identifies candidate pages for creation of the from-space in the next iteration of the process.

The above two phases of the disclosed method form an iteration of the invention. In each iteration of the disclosed method, the from-space formed in the previous iteration is released after remapping of any references to memory objects in the from-space, new from-space is formed from the candidate pages identified in the previous iteration and candidate pages for the next iteration are identified. Thus, in the very first iteration no remapping is needed, as there is no from-space. Since there are no candidate pages identified, no formation of from-space takes place. Candidate pages for the second iteration are identified. Similarly in the last iteration, there is no need for identification of candidate pages. Unreachable memory objects are freed up when the from-space is released.

Steps of the Disclosed Method

Figure 2:
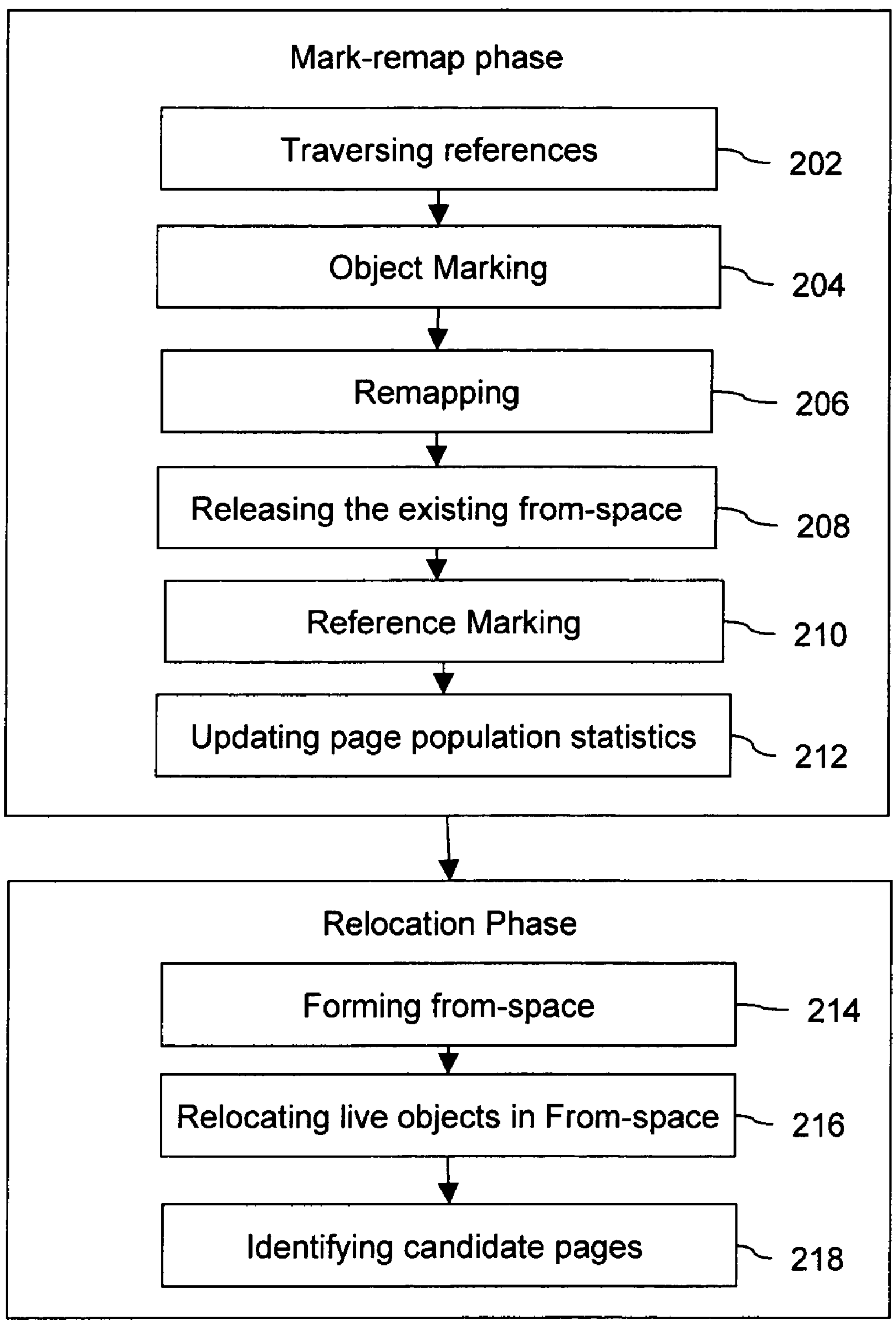
FIG. 2 is a flowchart illustrating the major steps of the disclosed method in accordance with an embodiment of the present invention.

FIG. 2 is a flowchart illustrating the major steps of the disclosed method in accordance with an embodiment of the present invention. The two phases described above make up an iteration of the disclosed method. At step 202, all the references are traversed. References are links from one memory object to another. Examples of references include pointers. All the references from the mutator threads are obtained and are posted in a queue, as will be explained in detail in conjunction with FIG. 3. All the root references, which are not in mutator stacks, are also posted. All posted references are traversed through. If more references are added during traversal, then those are also traversed through. Traversing is continued until all the posted references are traversed through.

At step 204, all memory objects are marked. This step is called object marking. Each object has a mark bit. The mark bit signifies whether the object is live or dead. A mark bit with the LIVE value signifies that the object is live or reachable. A mark bit with the DEAD value signifies that the object is dead or unreachable. At the start of the Mark-remap phase of the disclosed method, the LIVE and DEAD values are flipped. For example, if in an iteration a binary bit value '1' represents LIVE and a binary bit value '0' represents DEAD then in the next iteration binary bit value '0' represents LIVE and binary bit value '1' represents DEAD. Object marking sets the mark bits of all live objects to the current value of LIVE. The step of object marking is explained in detail in conjunction with FIG. 4.

At step 206, any reference that points to a memory object in the from-space is remapped. During relocation in the previous iteration, forwarding pointers are placed on the from-space copies of all the memory objects that are relocated. During remapping, the reference is remapped according to the forwarding pointer. The step of remapping is explained in detail in conjunction with FIG. 5. After remapping, the reference points to the new location of the memory object or the reference is terminated. At step 208, the existing from-space is released. Thus, the memory objects in the from-space are available as free memory for reallocation.

At step 210, all the traversed references are marked. Each reference has a reference mark bit, which signifies whether the reference has been traversed through or not. A reference mark bit with the MARKED THROUGH value signifies that the reference has been traversed through. A reference mark bit with the NOT MARKED THROUGH value signifies that the reference has not been traversed. At the start of an iteration of the disclosed method, the MARKED THROUGH and NOT MARKED THROUGH values are flipped. For example, if in an iteration MARKED THROUGH had a binary bit value '1' and NOT MARKED THROUGH had a binary bit value '0' then in the next iteration MARKED THROUGH has a binary bit value '0' and the NOT MARKED THROUGH has a binary bit value '1'.

At step 212, the page population statistics are updated with the statistics of the memory objects being pointed to by the references being traversed. The page population statistics are used to identify candidate pages. The step of updating page population statistics is explained in detail in conjunction with FIG. 6. At step 214, from-space is formed from the candidate pages identified in the previous iteration. At step 216, live memory objects in the from-space are relocated. The live memory objects are copied and placed at new locations. Forwarding pointers are placed at the from-space copies of these memory objects. At step 218, candidate pages for the next iteration are identified. The page population statistics provide details about memory pages pertaining to the number of live memory objects in each page and total live memory size in each page. Pages with the smallest live memory size are identified as candidate pages for the formation of from-space in the next iteration. These steps are illustrated more clearly with an example discussed in conjunction with FIG. 7.

The steps of the disclosed method will hereinafter be described in detail in conjunction with accompanying flowcharts. The description of the disclosed method comprises description of steps of an iteration, which is neither the first, nor the last iteration of the disclosed method. Hence, this iteration has a set of candidate pages and a from-space. The set of candidate pages and the from-space are formed in the iteration preceding the described iteration. Similarly, at the end of the described iteration, a set of candidate pages is identified and from-space is formed for the next iteration.

The Mark-remap Phase

Pre-initiation Steps for the Mark-remap Phase

Before the start of Mark-remap phase: all live or reachable objects have their mark bit set to the current LIVE value, all references to live objects in the allocated memory have their reference mark bits set to the current MARKED THROUGH value, the from-space does not have any objects since all the memory objects in the from-space have been relocated in the previous iteration and all relocated memory objects have proper forwarding pointers placed in their from-space copies. Right after the commencement of the Mark-remap phase, the LIVE and DEAD values are interchanged and the MARKED THROUGH and NOT MARKED THROUGH values are interchanged. Hence, after the commencement of the Mark-remap phase: all live or reachable objects have their mark bit set to the current DEAD value and all references to live objects in the allocated memory have their reference mark bits set to the current NOT MARKED THROUGH value.

Before the start of the Mark-remap phase, all the mutator threads are notified that the Mark-remap phase is starting. Each mutator thread is stopped separately and notified. Along with this notification, the current values of LIVE, DEAD, MARKED THROUGH, and NOT MARKED THROUGH are also conveyed to the mutator threads. Notification of various values involves communication across the collector and the mutator threads. The collector uses a signaling or notification mechanism that assures that the mutator thread is interrupted at a point where the state of its stack is known. Determining the variables indicative of the state of the stack will be apparent to anyone skilled in the art. The stack state is required in order to later resume the operation of the mutator thread at the same point where it has been interrupted. The mutator is then able to locate all references on the stack. These points are referred to as safepoints. A safepoint is a point in executing program code in which the program can be halted, and it is possible to determine the program's state, modify it, and restart the execution of the program. In a garbage collection process, a safepoint is a point where the references in use by the program can be identified. These references can then be modified and the program restarted.

An example of a notification mechanism is cooperative polling. By polling, each program continuously checks the other program to see what state it is in. The cooperative polling referred to here utilizes a take-safepoint flag, a notification queue, and a reply queue. The take-safepoint flag is a global, per-thread memory location. The take-safepoint flag is used to halt a mutator thread when it comes to a safepoint. On usage of a take-safepoint flag, a mutator thread's state is not modified directly. Instead, the flag is set by another thread that wants the mutator to stop. The mutator thread executes code that is known to pass through safepoints periodically. At each such safepoint, a mutator thread polls a take-safepoint flag. If the flag is set, the thread jumps into a safepoint handler and processes any pending notifications from the notifications queue. The thread then replies to the collector through a reply queue. The thread then verifies that the notification queue is empty and resets the take-safepoint flag. It then returns to normal operation. When the collector wishes to notify a mutator thread, it posts a notification message to the mutator-thread's notification queue and sets the thread's take-safepoint flag. It then awaits a reply from the thread on a reply queue for either synchronous or asynchronous completion.

The take-safepoint flag can be accomplished on conventional architectures via additional assembly language in the program code that checks the flag. It can also be accomplished via hardware, such as processor control registers that indicate a safepoint is needed by another thread, and the hardware checking of the mutator's assembly code to see if a safepoint has been reached. It is apparent to anyone skilled in the art that other methods for achieving this exist in the art and the method described above does not limit the scope of the disclosed invention.

The notification mechanism as described above is used at the beginning of the Mark-remap phase to update LIVE, DEAD, MARKED THROUGH and NOT MARKED THROUGH values, and to enable the reference bit trapping by the Loaded Value Barrier (LVB). The notification mechanism is also used at the end of the Mark-remap phase to disable reference mark bit trapping by the LVB. The notification mechanism is also used during the relocation phase, as each page is designated as from-space, to assure these pages are protected from mutator access by the mutator thread. Once notified about a page being designated from-space, a mutator thread makes sure that the Access Barrier (AB) triggers on any mutator attempt to access the page's contents, and that a LVB triggers whenever the mutator loads a reference to the page from memory. It will be apparent to anyone skilled in the art that the notification mechanism described above is only for illustrative purposes. The notification between the collector and the mutator can be achieved by using several other methods existing in the art without deviating from the scope of the invention.

The Step of Traversing References

Figure 3:
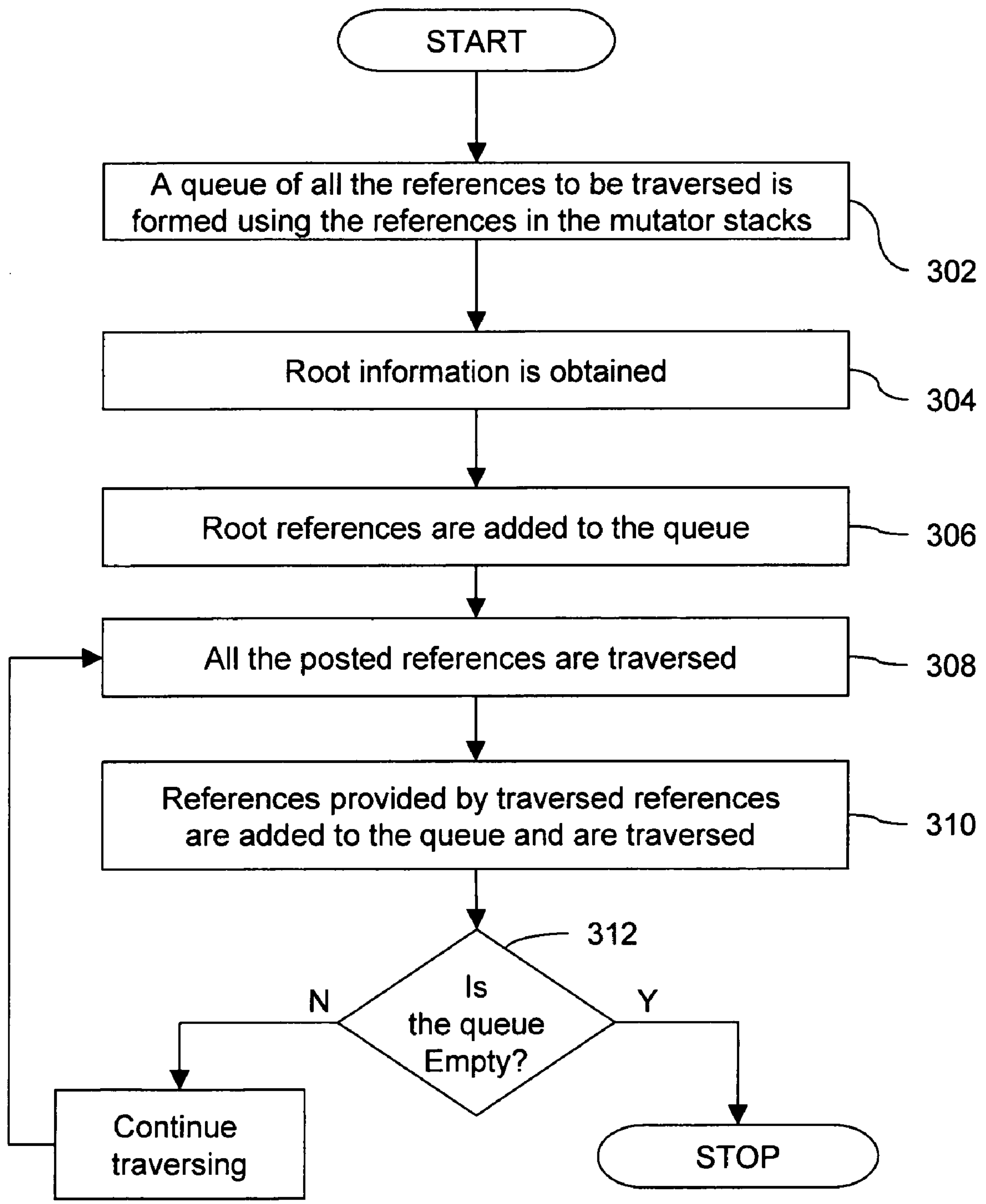
FIG. 3 is a flowchart illustrating the steps followed while traversing references in accordance with an embodiment of the present invention.

The Mark-remap phase involves traversing of references. The traversal is achieved by following references from the roots. The roots comprise all references in registers of the mutator thread executing the program, all static references, and references into the allocated memory from any other memory location outside the allocated memory. FIG. 3 is a flowchart illustrating the steps of traversing references.

At step 302, a queue of all the references to be traversed is formed using the references in the mutator stacks. In order to traverse the references not in the mutator stacks, root information is obtained at step 304. Root information contains references to memory objects. At step 306, all the root references that are not there in mutator stacks are added to the queue. At step 308, all the references in the queue are traversed. During traversal, each reference may provide more references. At step 310, such references are also added to the queue and are subsequently traversed. At step 312, a check on the queue of references to be traversed is performed, and the references are traversed until the queue becomes empty.

The Step of Object Marking

Figure 4:
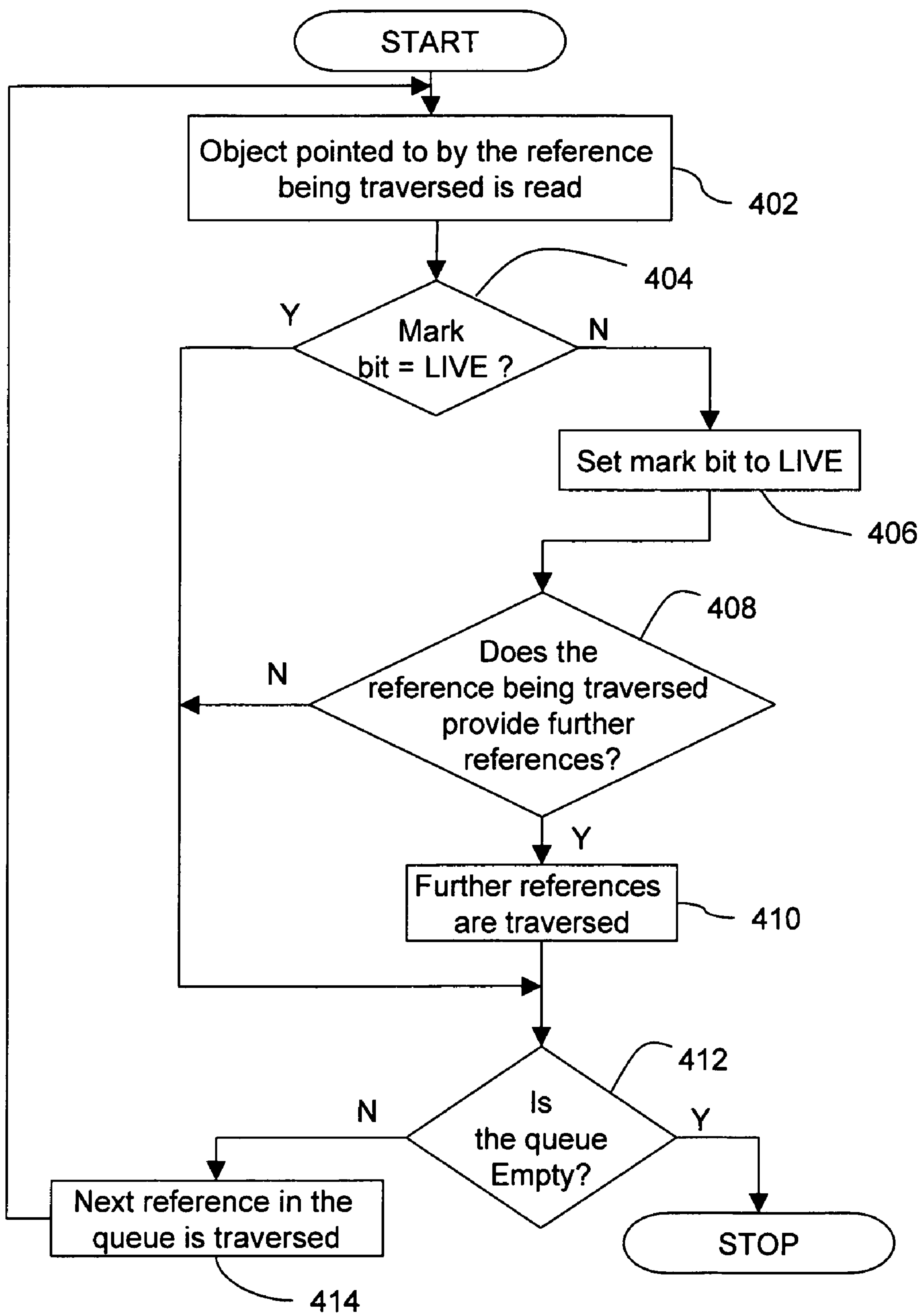
FIG. 4 is flowchart illustrating the steps followed in order to mark the memory objects in accordance with an embodiment of the present invention.

FIG. 4 is a flowchart illustrating the steps followed in order to mark the memory objects. This process is referred to as object marking. As each reference is followed, the object it points to is tested for a LIVE mark. At step 402, the object pointed to by the reference being traversed is read. At step 404, mark bit of the memory object pointed to by the reference is tested. If the mark bit is set to the current LIVE value then the next reference in the queue is traversed. If the mark bit is not set to the current LIVE value then it is set so at step 406. At step 408, it is checked if the reference being traversed provides any further references. If it does, then at step 410, the further references are traversed and the same process for object marking is repeated for that reference. After the further references are traversed or if there are no references provided by the reference being traversed, then at step 412, it is checked if the queue is empty. If the queue is not empty then, at step 414, the next reference in the queue is traversed for the purpose of object marking.

The Step of Updating Page Population Statistics

Figure 5:
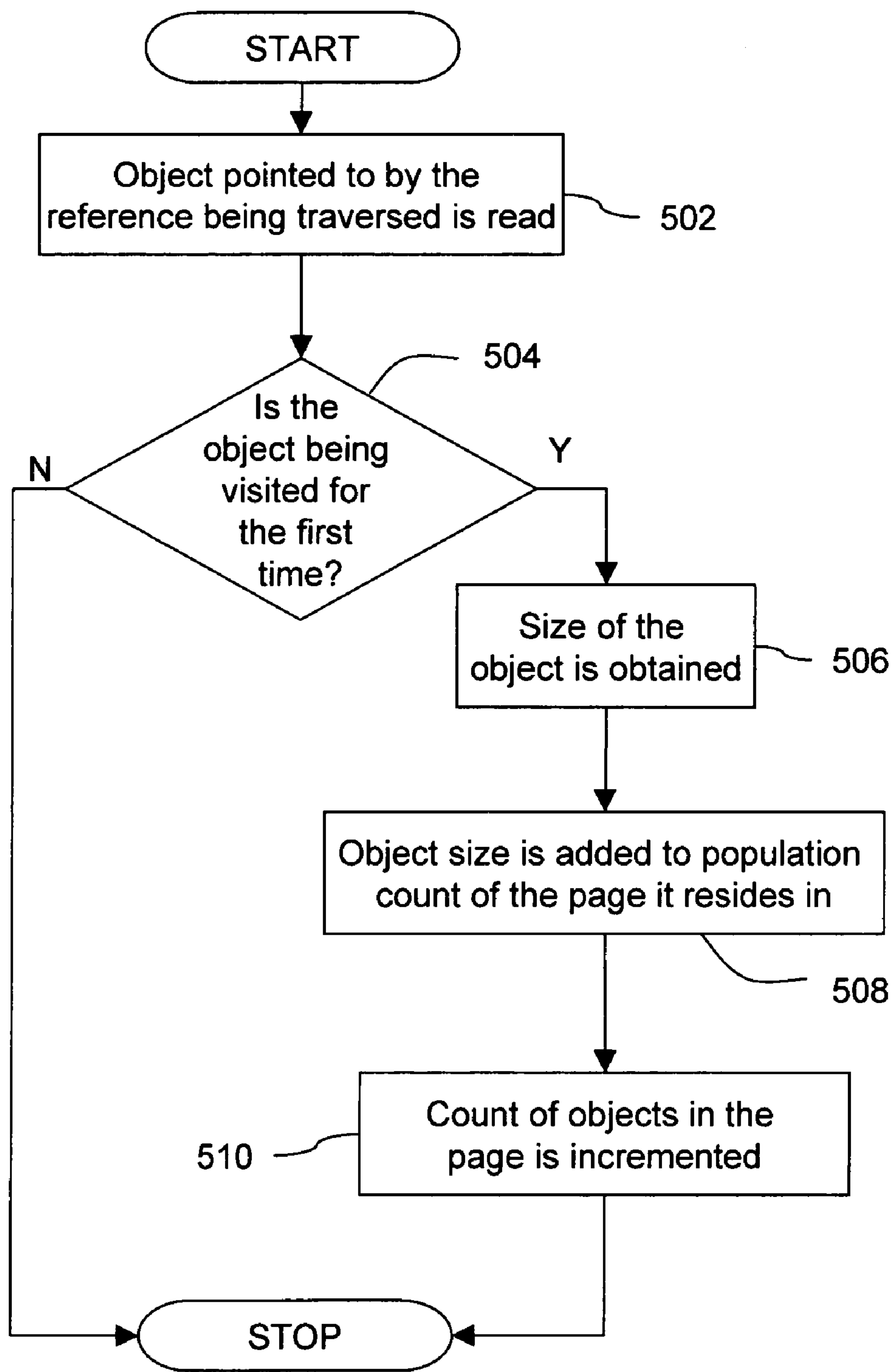
FIG. 5 is a flowchart illustrating the steps involved in updating page population statistics in accordance with an embodiment of the present invention.

After object marking, page population statistics are updated with the object's statistics. The page population statistics of a page comprise object sizes of all the live memory objects in the page. The page population statistics provide details regarding the number of live memory objects in a page. These statistics are used to identify the candidate pages for the formation of from-space. FIG. 5 is a flowchart illustrating the steps involved in updating page population statistics. The Mark-remap phase traverses references and visits objects pointed to by the reference. At step 502, the object pointed to by the reference being traversed is read. At step 504 it is determined if the object being pointed to by the reference being traversed is being visited for the first time. If the memory object is visited for the first time, then at step 506 the size of the memory object is obtained. At step 508, its size is added to the population count of the page it resides in. At step 510, count of live memory objects in that page is incremented. At the end of the Mark-remap phase, all pages have a count of all possibly live memory objects in them. The objects are termed as possibly live because during the course of the traversal some memory objects may become unreachable and hence they may be dead.

The Step of Remapping

The collector designates a certain number of pages as from-space pages in each iteration and relocates objects from the from-space pages to the normal heap allocated during the Relocation phase. This relocation is completed before the Mark-remap phase of the next iteration begins. During a Mark-remap phase, all traversed references are tested for pointers to objects in from-space pages and any such references are remapped to point to the relocated objects.

Figure 6:
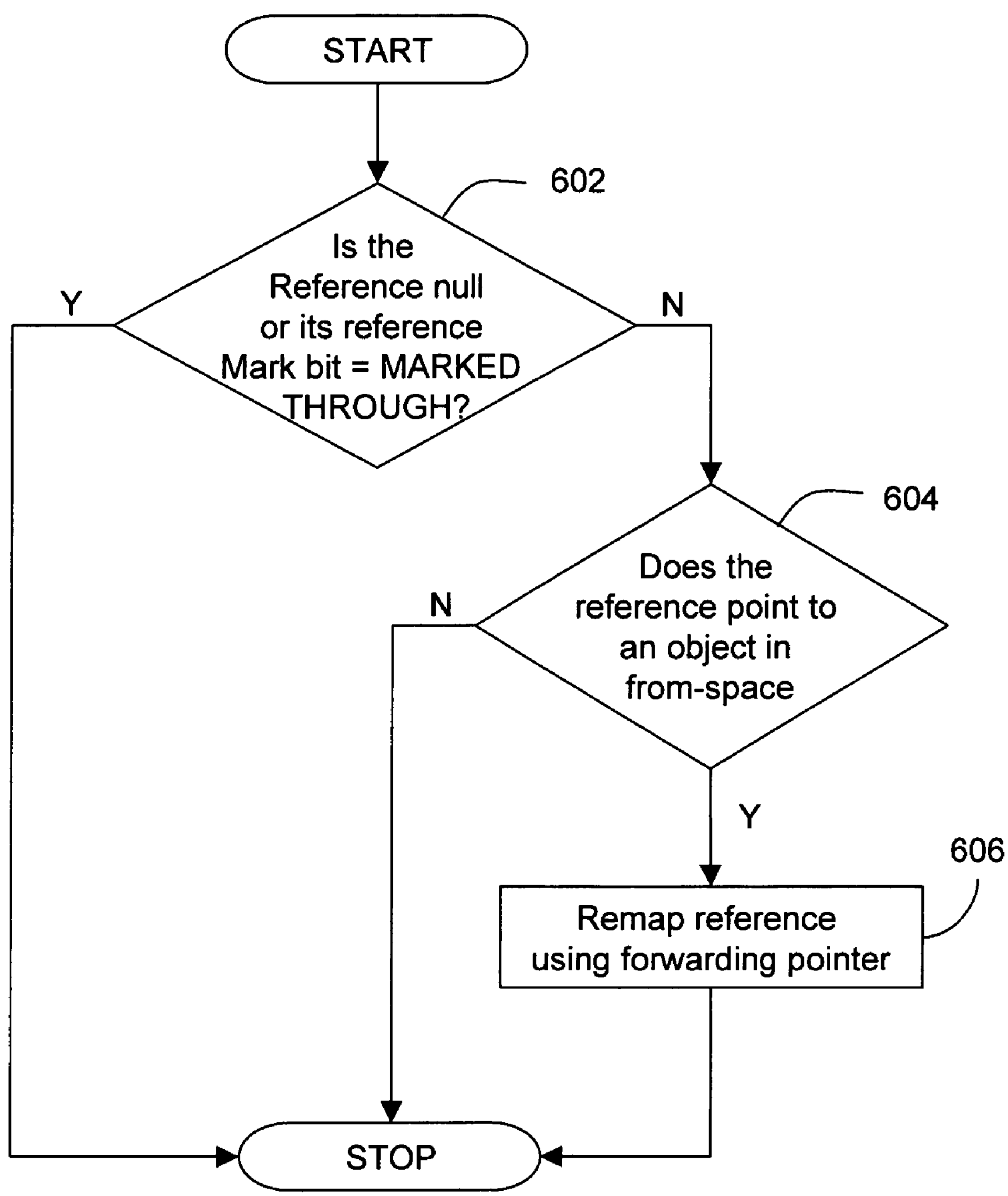
FIG. 6 is a flowchart illustrating the steps involved in remapping of references in accordance with an embodiment of the present invention.

FIG. 6 is a flowchart illustrating the steps involved in remapping of references. During this remapping, the references are traversed one by one. At step 602, it is checked if the reference being traversed is null or if its reference mark bit is set to the current MARKED THROUGH value. If the reference is not null and its mark bit is not set to the current MARKED THROUGH value then the reference is tested for remapping. At step 604, it is checked if the reference points to an object in the from-space pages. If the reference points to an object in the from-space, then at step 606, the reference is remapped by using the forwarding pointer placed on the object in the from-space page.

The reference mark bit of each reference being traversed is tested and the reference mark bit is set at the current MARKED THROUGH value. At the start of the traversal, a recursion depth is specified in order to limit the number of recursive calls made to a collector function while traversing the references. If the recursion depth specified at the start of the traversal is less than the allowed maximum recursion depth then the recursion depth is incremented. If the recursion depth is equal to the maximum allowed recursion depth, then the reference to be traversed is marked for later traversal. The reference is posted in the queue so that it is traversed later. As the references are traversed in a queue, it is apparent to anyone skilled in the art that posting a reference to the queue for later traversal further limits the number of recursive calls made during traversing.

Mutator Interaction During Mark-remap Phase

As the Mark-remap Phase proceeds, all mutator threads are free to execute concurrently. There is no 'stop-the-world' mutator synchronization required during the Mark-remap phase. In stop-the-world mutator synchronization all the mutator threads are stopped at the same time and are synchronized for the beginning of the Mark-remap phase. Before the phase begins its traversal, each mutator thread is separately stopped and is notified that the Mark-remap phase is starting. The mutator thread scrubs its local registers and stack, and then continues normal execution. The mutator stacks and registers are scrubbed so that they do not contain any references that have not yet been marked through or logged for later marking. To achieve minimal mutator thread pause time, the stack scrubbing operation is well contained, and limited to simple, non-recursive logging or remapping of references in registers and on the stack.

All allocations done by mutator threads always mark the newly allocated object with the current LIVE value of the mutator thread, and the initial reference to the new object with the mutator thread's current MARKED THROUGH value. These values are maintained as thread-local variables, and may differ between mutator threads during the initiation of a Mark-remap phase. This is necessary to make sure that the scrubbing of registers and stack by each thread is correct and error-free. However, before the Mark-remap phase traverses its first reference all mutator threads are guaranteed to agree on the values of LIVE and MARKED THROUGH.

Since the collector executes the Mark-remap phase concurrently with the execution of the mutator, there is a possibility of an error due to both the programs accessing the same memory object. In order to avoid any such error, the mutator maintains certain invariants specific to the Mark-remap phase. The Mark-remap phase mutator invariants make sure that the mutator does not contain and is unable to load any references into its registers that have not yet been marked through or logged for later marking or if they point to any objects in the from-space. During a Mark-remap phase, the mutator maintains the required mutator invariants by using a Loaded Value Barrier (LVB) on any reference loaded into its registers. The barrier is implemented as a barrier handling code as will be explained later in detail. The barrier handling code is external to the mutator code and is triggered by the mutator. The barrier handling code deals with two types of trigger causes: Reference mark bit trigger and From-space trigger. Both of these triggers may occur at the same time.

Reference mark bit trigger: The mutator uses the LVB to detect and maintain logs of loaded references that have not yet been marked through. During a Mark-remap phase, the LVB triggers when a reference load is attempted where the reference's reference mark bit matches the current NOT MARKED THROUGH value. On a reference mark bit triggered LVB, the barrier handler adds the triggering reference to a pool of to be marked references, and modifies the reference mark bit on the reference to indicate it has been marked through in the current phase. The pool of to be marked references is kept local to the mutator thread. In an embodiment of the disclosed invention, the pool of to be marked references of the mutator thread is posted to the queue so that the references can be traversed. In another embodiment of the disclosed invention, each reference that is added to the pool is posted to the queue.

From space trigger: The mutator uses the LVB to cooperatively participate in reference remapping by detecting all loads of references to from-space pages and remapping them. On a from-space triggered LVB, the barrier handler remaps the reference by following a forwarding pointer left in the from space copy of the memory object.

At the end of a Mark-remap pass, after all live objects have been traversed, each mutator thread is separately stopped and notified that the Mark-remap phase has ended. At the end of a single Mark-remap phase: all live objects have their mark bit set to the current LIVE value, all references to live objects in the allocated memory space have their reference mark bits set to the current MARKED THROUGH value, no references to from space memory objects exist and from space pages may be reclaimed and used in further allocation.

Relocation Phase

At the beginning of a Relocation phase, all live objects have their mark bit set to the current LIVE value, no pages are designated as from space, no references to from space memory objects exist, a set of candidate pages exists that is intended to become from space pages in the current Relocation phase.

The relocation phase initiates compaction of a portion of the memory space allocated to the program by relocating objects from some sparsely populated pages into compacted mostly-contiguous areas. Relocation phase uses page population statistics collected during the previous Mark-remap phase. The page population statistics are used to identify sparsely populated pages that make good candidates for compaction in the relocation phase, and to determine the number of pages needed to satisfy the required reclamation amount. The pages that fit the criteria are termed as candidate pages and are used for relocation in the Relocation phase of next iteration.

Figure 7:
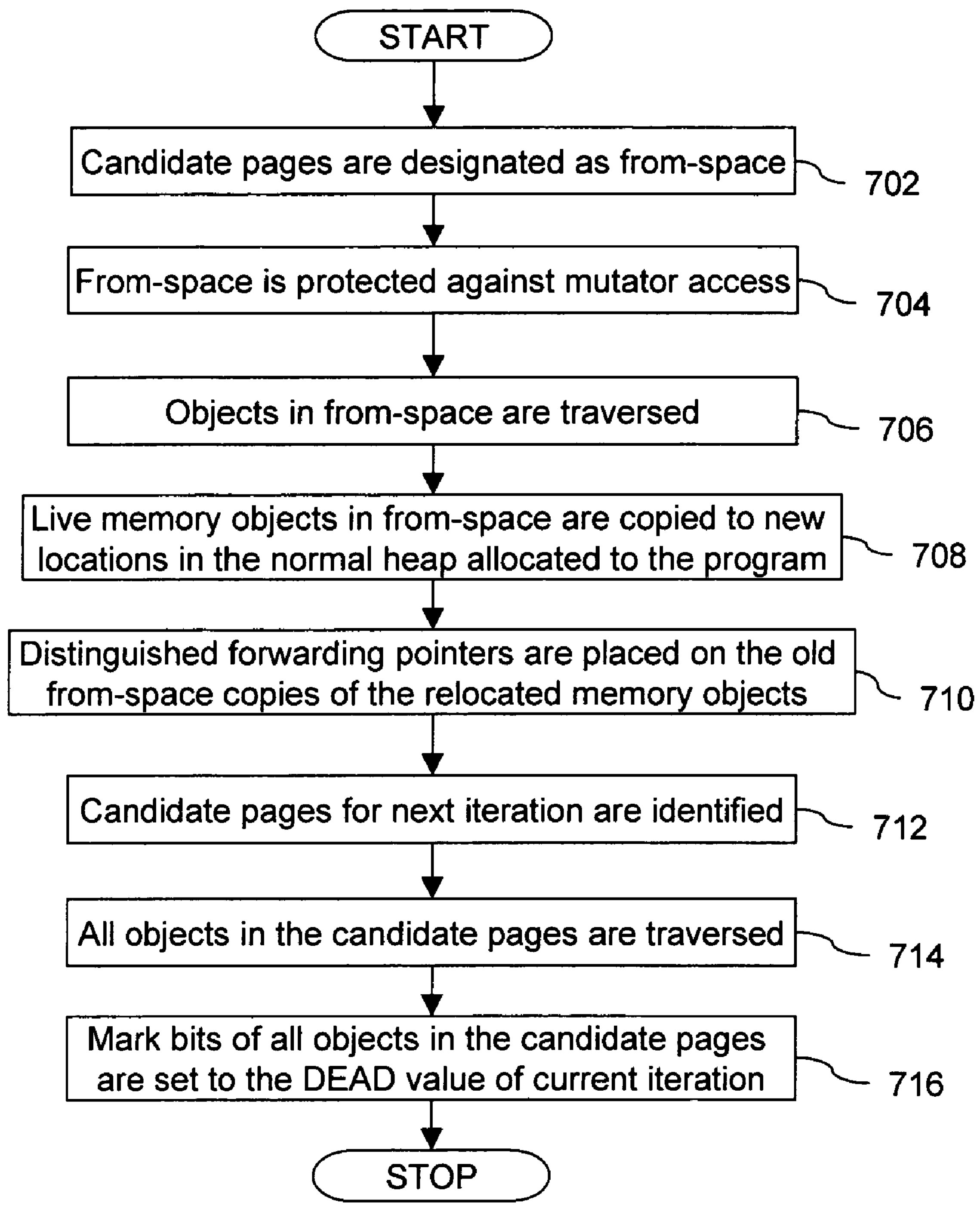
FIG. 7 is a flowchart illustrating the steps of the Relocation phase.

FIG. 7 is a flowchart that illustrates the steps of the Relocation phase. The candidate pages identified in the previous iteration serve as an input to the Relocation of the current iteration. At step 702, the candidate pages are designated as from-space pages. At step 704, newly designated from-space is protected against mutator access. The protection of from-space pages against mutator access is ensured by the use of mutator invariants and barriers. The implementation of such protection of from-space pages is explained below in detail. At step 706, all the objects in the from-space pages are linearly traversed. At step 708, all objects with mark bits set to the LIVE value of the current iteration are copied to new locations in the normal heap allocated to the program. The live memory objects thus relocated are placed in the normal heap such that a compact contiguous block of live memory objects is formed. At step 710, forwarding pointers are placed on the old from-space copies of the relocated memory objects. The forwarding pointers provide information about the new location of the memory objects for any further referral. At step 712, candidate pages for the next iteration of the disclosed method are identified. Candidate pages are identified using the page population statistics. The pages having smallest live memory size are identified as candidate pages. At step 714, all objects in the pages identified as candidate pages are linearly traversed. At step 716, mark bits of all the traversed objects are set to the DEAD value of the next Mark-remap phase. The subsequent Mark-remap phase that occurs before actual relocation marks all live memory objects within the candidate page before they are compacted. This filters out long-dead memory objects that may otherwise appear live to the relocation phase.

Object relocation within the Relocation Phase can be done on one page at a time, or in some combination like batches of pages done together. This relocation granularity may statistically affect the level of initial mutator performance degradation, and avoiding large instantaneous batches of relocations may help avoid large initial remapping storms by spreading the remapping work drain over a longer period.

Mutator Interaction During Relocation Phase

Pages designated as from space are protected from mutator access. There is an initial notification sequence where each mutator thread is notified about the newly protected pages. Notification mechanisms like cooperative polling as described earlier can be used in order to notify the mutator threads. After notification, the mutator threads trigger barriers on access of the newly protected pages. While this notification does not require a stop-the-world pause, any mutator thread that triggers a barrier when attempting access to a from-space page during notification is blocked until all other threads receive their notification and are guaranteed to trigger their own barrier on that same page. Actual object relocation is not performed until notification reaches all mutator threads. This synchronization between the Relocation phase and the barrier handlers is done using status tags at each page header. Barrier handlers requiring relocation will not proceed with cooperative relocation until the page has been tagged NOTIFIED. A page tagged with the NOTIFIED mark signifies that all the mutator threads have been notified about the page status. In effect, no object in the page is relocated until all mutator threads are notified of the page's status as a from-space page, and are guaranteed to trigger barriers on attempts to access it.

Once all mutator threads are made aware of a from-space page's new status, relocation of its contents can proceed cooperatively. In addition, once notification is complete, the individual mutator threads can safely begin their remapping behavior, which is identical to the remapping done during the Mark-remap phase. As the relocation phase linearly traverses the page and relocates memory objects, mutator threads may concurrently attempt access to memory objects in a from-space page through latent not-yet-remapped references, and may attempt to load from-space references into their registers. These attempts are intercepted by barriers and handled accordingly.

In order to avoid errors, the mutator maintains invariants for the Relocation phase. The Relocation phase invariants make sure that the mutator does not load or follow any references that point to objects in the from-space pages. The LVB is triggered when the mutator attempts to load a reference to a from-space page. The LVB barrier handler remaps the reference using the from-space object's forwarding pointer, and the remapped reference is stored back to the source memory location. Another barrier called Access Barrier (AB) is triggered when the mutator attempts to access an object in from-space through latent not-yet-remapped reference in one of its registers. The AB handler remaps this reference using the from-space object's forwarding pointer, and the register contents are replaced with the remapped reference. The implementations of LVB and AB are explained in detail later under the heading 'Barriers'.

In either of the above barrier triggers, if the reference has not yet been relocated, which implies that no forwarding pointer exists in the from-space copy, then the object is cooperatively relocated. Such cooperative relocation may be done immediately, without waiting for the Relocation phase to reach the object through linear traversal. Cooperative relocation in triggered barriers proceeds only on pages that are tagged with the NOTIFIED mark.

At the end of a Relocation phase, all live objects have their mark bit set to the current LIVE value, all references to live objects in the memory space allocated to the program have their reference mark bits set to the current MARKED THROUGH value, all objects in from-space pages are fully relocated to the normal heap, all relocated objects have proper forwarding pointers placed in their from-space copies, references to from-space objects may still exist, and may be encountered by the mutator or the collector, a set of candidate pages is identified, these pages are intended to become from-space pages in the next Relocation phase and all objects in candidate pages have their mark bit set to the current LIVE value.

The two phases of the disclosed method described above will be illustrated using an example in conjunction with FIG. 8.

Computer Program Product Embodiment

The disclosed method is implemented as a computer program product (CPP) in a preferred embodiment on a data processing system. The psuedo code for the Mark remap phase of the disclosed method is shown in Table 1. The disclosed method can be coded by using any programming language such as Java, C++, and the like. The program code for the Mark-remap phase of the disclosed method can be based on psuedo code as shown in Table 1.

TABLE 1

```
markRemapTraverseAllReferences ( ) {
/* Notify all mutator threads. Have them post all references in their
stacks:
NotifyAllMutatorThreads (START_MARK_REMAP, LIVEValue,
DEADValue, MARKEDTHROUGHValue,
NOTMARKEDTHROUGHValue);
/* Post all root references for traversal:
for all references in non-mutator-stack root references {
postReferenceForMarkRemapTraversal(ref);}
/* Traverse all posted references. Each traversal may add more
references to the queue. Keep traversing until all posted references
are gone.*/
while (toBeTraversedQueue not empty) {
markRemapTraverseReference(toBeTraversedQueue.getHead( ),
0); }}
postReferenceForMarkRemapTraversal(ref){
toBeTraversedQueue.addToTail(ref); }
markRemapTraverseReference(ObjectReference oRef, int
recursionDepth) {
    If (oRef->mark != LIVE) {
        oRef->mark = LIVE;
/*Collect page population statistics:
        pageBase = pageAlignedAddress(oRef);
        pageBase.stats.liveBytesCount += objSize(oRef);
        pageBase.stats.liveObjCount++;
/* Traverse each reference field in the Object:
        For each (field in oRef's reference fields) {
            ref=oRef->field;
    if ((ref != NULL) && (ref.ReferenceMarkbit !=
MARKEDTHROUGH)) {
/* Check if remapping is needed:
    if (ref point-to from-space) {
/* Remap by following forwarding pointer:
            ref = ref->forwarding_pointer; }
/* Mark reference as MarkedThrough
        ref.referenceMarkbit = MARKEDTHROUGH;
/* Store marked (and potentially relocated) ref back to field:
        oRef->field = ref;
/* Traverse the reference:
        if (recursionDepth < MAX_RECURSION_DEPTH) {
            markRemapTraverseReference(ref, recursionDepth + 1);
        } else {
/* Recursion is at max depth for depth-first, break recursion by
posting reference for later traversal:*/
            postReferenceForMarkRemapTraversal(ref); } } } } }
```

The program code for the Relocation phase of the disclosed method can be based on psuedo code as shown in Table 2.

TABLE 2

```
    relocationPhase( ) {
        /* Pick new from-space pages base on candidate pages from
    previous iteration.
        fromSpacePageList = candidatePageList;
        /* Notify the mutator threads the relocation is
        going to begin, and
    wait for them
        /* to enable barriers on the from-space pages.
        notifyRelocationToAllMutatorThreads( fromSpacePageList );
        /* Traverse the objects in the from-space pages.
        for each ( object in from-space ) {
            relocateFromSpaceObject(object);
        }
        /* Locate the pages with the fewest live bytes of objects.
        sortedList = sort pages by page population live bytes count;
        /* Starting with the emptiest page, select candidate pages for
    next iteration */
        candidatePageList = emtpyList;
        candidateDeadBytes = 0;
        for page p ( in sortedList ) {
                relocationClearObjectMarks( p );
                candidatePageList.addPage( p );
                candidateDeadBytes += PAGE_SIZE -
    p.stats.liveBytesCount;
            /* Stop adding to candidate pages once we
```

TABLE 2-continued

```
                have identified the
    necessary number of dead objects.*/
                    if ( candidateDeadBytes >
    MINIMUM_CANDIDATE_DEAD_BYTES ) break out of loop;
            }
        }
        relocateFromSpaceObject( ObjectReference oRef ) {
            /* Only relocate objects, which are LIVE
            if ( oRef->mark == LIVE ) {
                /* Allocate a new location in to which the
                object will be
    relocated. */
                newRef = allocateObjectOutsideFromSpace
                ( objSize(oRef) );
                /* Copy the object out of from-space
                copyMemory( oRef, newRef, objSize(oRef) );
                /* Install a forwarding pointer
                oRef->forwarding_pointer = newRef;
            }
        }
        relocationClearObjectMarks( page ) {
            /* Mark each object in the page LIVE, so they will
            all be marked
    DEAD at the start
            /* of the next Mark-remap phase.
            for each ( object in page ) {
            object->mark = LIVE;
            }
        }
```

EXAMPLE

In both the Mark-remap and Relocation phases, the mark bits on memory objects and references play an important role. The values of LIVE, DEAD, MARKED THROUGH and NOT MARKED THROUGH undergo changes as the disclosed method proceeds through a number of iterations. The operation of the disclosed method, with respect to the state of various marks during a few iterations of the disclosed method, is explained hereinafter in conjunction with an exemplary situation.

The exemplary situation looks at five objects named A, B, C, D, and E existing in the memory allocated to a program. Some objects contain references to other objects. The root references point to objects A and B. FIG. 8 shows a state table of the various marks at various stages of the disclosed method. Object A contains reference x and y to objects B and C respectively. A.mark denotes the mark bit on A. A.x.refmark denotes the reference mark bit on reference on A to B. A.y.refmark denotes the reference mark bit on reference to C. B.mark denotes the mark bit on memory object B. C.mark denotes the mark bit on memory object C. C.x.refmark denotes the reference mark bit of the reference on C to B. D.mark denotes the mark bit on D. D.x.refmark denotes the reference mark bit of the reference on D to B. E.mark denotes the mark bit on E. E.x.refmark denotes the reference mark bit of the reference on E to B. The root contains the initial references to A and B.

FIG. 8 shows certain transitions in the state of the five objects. Column 802 includes the labels used to denote the objects. Column 804 includes the labels used to denote the mark bits associated with the objects and the references. Column 806 includes the values of the mark bits at the start of the disclosed method. Column 808 includes the values of the mark bits at the end of the first Mark-remap phase. Column 810 includes the values of the mark bits at the end of the first Relocation phase. Column 812 includes the values of the mark bits at the end of the second Mark-remap phase. Column 814 includes the values of the mark bits at the end of the second Relocation phase. Column 816 includes the values of the mark bits at the end of the third Mark-remap phase. Column 818 includes the values of the mark bits at the end of the third Relocation phase. Column 820 includes the values of the mark bits at the end of the fourth Mark-remap phase. Row 822 includes the bit values of the object mark bit indicating LIVE during various phases of the disclosed method. Row 824 includes the bit values of the reference mark bits indicating MARKED THROUGH during various phases of the disclosed method.

As shown in FIG. 8, in the beginning A, B, and C are reachable objects as reference mark bit value '0' indicates MARKED THROUGH and binary bit value '0' indicates LIVE. After the first Mark-remap phase, A, B, and C are still reachable as binary bit value '1' indicates MARKED THROUGH and binary bit value '1' indicates LIVE. For the first Relocation phase there is no candidate page to be converted to from-space. Objects B, C, and E are selected in the candidate page to be converted to a from-space page in the next iteration as described in conjunction with step 218 of FIG. 2 and step 712 of FIG. 7. B.mark, C.mark, and E.mark are all set to binary bit value '1' to indicate DEAD in the next phase.

The next Mark-remap phase sets the mark bit of all reachable objects to binary bit value '0', leaving the dead objects in the candidate page with a mark of binary bit value '1'. After the second Mark-remap phase A, B, and C are reachable, binary bit value '0' on reference mark bit indicates MARKED THROUGH and binary bit value '1' on mark bit indicates LIVE. D is not in the candidate page and, therefore, its mark bit has binary bit value '0' even though it is not reachable. E is in the candidate page and since it is not reachable its mark bit is set to binary bit value '1' indicating DEAD.

After the second Relocation phase, the candidate page identified by the previous iteration is set as from-space page and its live contents are relocated as described in conjunction with step 216 of FIG. 2. Page containing object D is selected as candidate for next from-space. Objects B and C were in the from-space and hence are relocated. This is indicated by 'Rel' in parentheses in column 814. References A.x, A.y, and C.x to B and C have not been changed and may contain pointers to the from-space page. Object E's mark reads DEAD and, therefore, object E was not relocated. It is in the from-space page and will die when the from-space is released at the end of the next Mark-remap phase. This is indicated by a 'F-S' in parentheses in column 814.

At the end of third Mark-remap phase A, B, and C are reachable and LIVE and MARKED THROUGH values are as shown in FIG. 8. If not remapped earlier, references A.x, A.y, and C.x are remapped and point to new locations of objects B and C. The from-space page is released. Object E was still in the from-space and hence ceases to exist in the heap. In the third Relocation phase, the candidate page from the previous phase is set as from-space page and since no live contents were there, no relocations need to be carried out. Page containing object A is selected as candidate for next from-space. D is in the from-space. This is indicated by a 'F-S' in parentheses in column 818. Object is marked DEAD and therefore D is not relocated and remains in the from-space page. D ceases to exist in when the from-space is released at the end of the next Mark-remap phase. Since nothing is relocated in the third relocation phase, there is no remapping in the fourth Mark-remap phase. The from-space page is released and object D ceases to exist. This is indicated by X in column 820. The states of various marks are as shown in FIG. 8. Thus, after four iterations of the disclosed method, out of the five objects considered at the beginning only three exist and the other two cease to exist in the heap. The dead objects are removed form the memory space allocated to the program concurrently with the execution of the program. The execution is only stopped at the beginning and the end of the disclosed method.

System Embodiment

The disclosed method is implemented as a system that operates on a data processing system such as a personal computer. The data processing system has a processor and memory. The programs written or accessed by a user are stored in the memory of the data processing system and are executed by the processor. During execution of a program, the processor allocates memory objects in the memory for various functions and data involved in the program. The user-written program is executed by another program called a mutator. A program called a collector executes the program code for the disclosed method. In a preferred embodiment, both mutator and collector exist in the memory of the data processing system. In an embodiment of the disclosed invention, the collector can be independently executed on a separate data processing system having a memory and processing capabilities. For instance, an Application Specific Integrated Circuit (ASIC) can be designed specifically to perform the functions of the collector, and thereby manage the allocation of memory for a program being executed on a separate data processing system. It is apparent to anyone skilled in the art that ASIC has been cited here only for exemplary purposes and does not limit the scope the disclosed invention. Other hardware implementations of the disclosed are also possible.

The system implementing the disclosed method further includes modules for traversing references from the program, setting mark bits of objects to binary bit values signifying LIVE or DEAD, setting reference mark bits of references to binary bit values signifying MARKED THROUGH or NOT MARKED THROUGH, updating page population statistics with the statistics of the object being visited, testing reference being traversed for pointers to memory objects in from-space, remapping the reference to forwarding pointer on the memory object, releasing the from-space, relocating live memory objects in the from-space to new locations and for identifying candidate pages for formation of from-space. In a preferred embodiment, these modules are program codes that can be programmed in a language such as Java, C++, and other such languages. In an alternate embodiment, these modules may be implemented as ASICs that can be programmed by using any standard processor programming language, such as VLSI Hardware Description Language (VHDL). It is apparent to anyone skilled in the art that the above-mentioned programming languages are only for exemplary purposes and in no way limit the scope of the disclosed invention.

As described earlier, the mutator maintains certain invariants in order to avoid errors at various stages of execution of the disclosed method. In order to maintain these invariants, certain barriers are introduced. These barriers are executed by program codes called barrier handlers. The barrier handlers are external to the mutator and are triggered by the mutator in case any invariants are flouted invoking the barriers.

Mutator Invariants

Figure 9A:
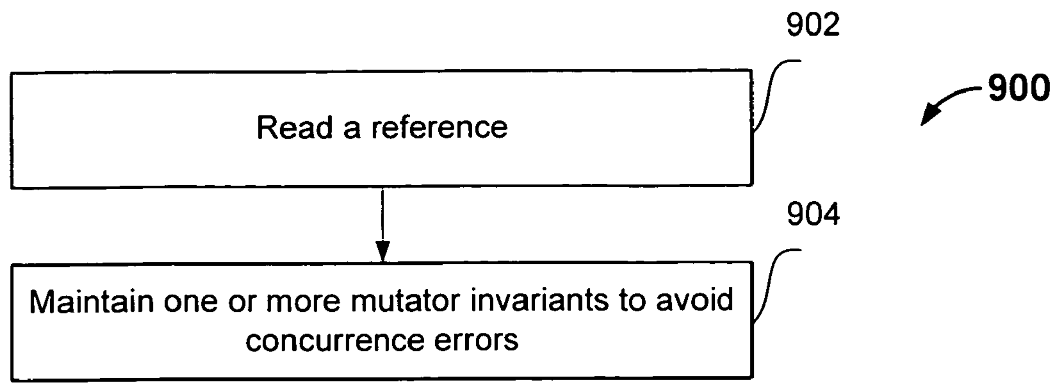
FIG. 9A is a flowchart illustrating an embodiment of a process for ensuring garbage collector processing.

Both the Mark-remap and Relocation phases are executed concurrently with the mutator threads. The phases of the disclosed method do not stop the execution of all the mutator threads at the same time. Concurrent operation may result in both the mutator thread and the collector operating on the same data or same memory object. FIG. 9A is a flowchart illustrating an embodiment of a process for ensuring garbage collector processing. A reference or a pointer is read (902). In order to avoid the occurrence of errors due to concurrent operation, the disclosed method maintains certain mutator invariants (904). Mutator invariants are conditions that are fixed and followed during both the phases. The two invariants maintained in the disclosed method are: Mark-remap phase mutator invariant and Relocation phase mutator invariant.

Figure 9B:
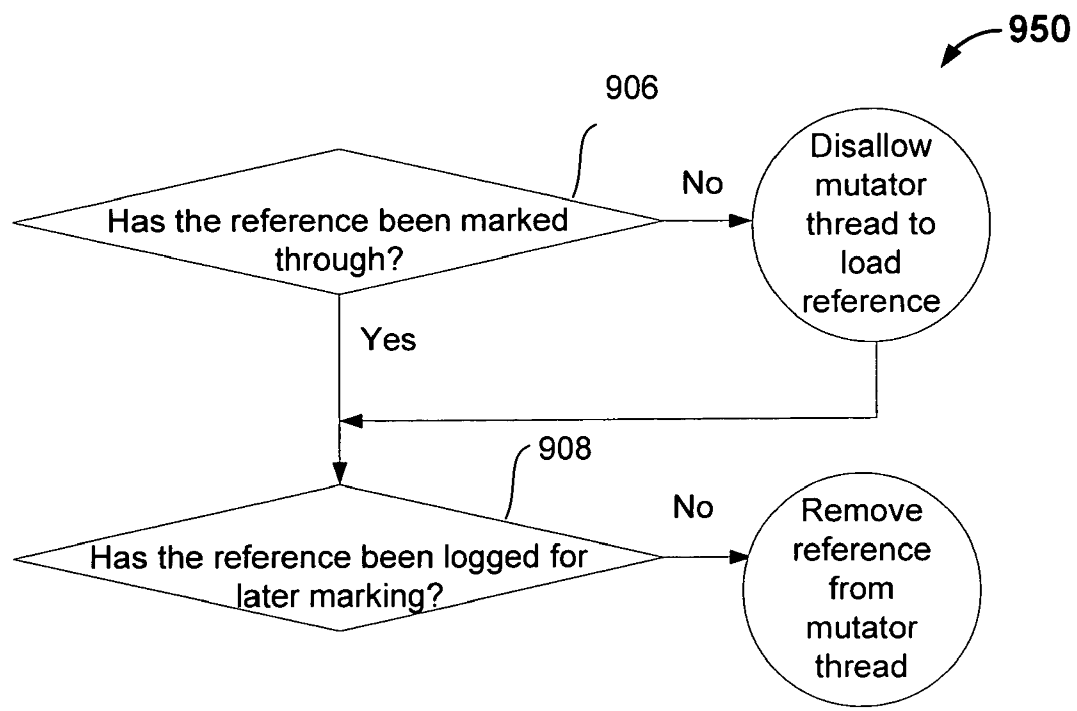
FIG. 9B is a flowchart illustrating a process for maintaining a mutator invariant.

FIG. 9B is a flowchart illustrating a process for maintaining a mutator invariant. During an active Mark-remap phase, the Mark-remap phase mutator invariant ensures that the mutator threads are not allowed to load any references, which have not yet been marked, into their registers (906). It also ensures that all references in the mutator thread registers, which have not yet been marked through or logged for later marking, are removed from the mutator thread (908). Further, the mutator threads cannot load any reference pointing to an object in the from-space into their registers. The invariant also ensures that all references to objects in the from-space are removed from registers of the mutator threads. As result of implementation of the Mark-remap phase mutator invariant, mutator threads are unable to propagate references that can bypass concurrent marking. Hence, only a single instance of object marking step of the disclosed method covers all live objects. Further, the invariant also prevents the mutator threads form propagating references to objects in from-space or accessing objects in the from-space in any way.

The Relocation phase mutator invariant ensures that during an active Relocation phase, the mutator threads are not allowed to follow references to objects in the from-space. Further, the mutator threads are also not allowed to load any references that point to objects in the from-space. Because of implementation of the Relocation phase mutator invariant, the mutator threads cannot read, modify, or propagate references to any objects in the from-space.

Barriers

The mutator invariants mentioned above, are maintained in the disclosed method via two types of barriers, which are: Loaded Value Barrier (LVB) and Access Barrier (AB). The mutator threads implement these barriers. The codes that execute the barriers are called barrier handlers. The barrier handlers are not considered a part of the mutator threads. The mutator threads use an LVB on all loaded references. An LVB test is performed on a reference value that is already loaded from a memory location, and is given the source location for potential fix-up operations. The LVB is triggered if the tested reference points to a memory object in the from-space or if during object marking the tested reference is non-null and has not yet been marked through in the current pass.

The implementation of the LVB tests can range from pure software tests to utilizing various degrees of hardware assists. The from-space page tests can be performed by utilizing Virtual Memory protection schemes embedded in hardware Translation Lookaside Buffers (TLB). The implementation of from-space page tests using TLBs should be apparent to anyone skilled in the art. Most TLB schemes in the Central Processing Units (CPU) of data processing systems can achieve this by implementing read protection on proper pages, and having the barrier attempt access through the loaded reference. An extended TLB scheme with specific protection bits and a privilege mode can make for clean implementation of the disclosed method. The testing of reference mark bit of a reference can be performed in pure software by sacrificing a bit of virtual address in references for this purpose in all heap-stored references. The software test would conditionally test the reference mark bit against the current binary bit value signifying NOT MARKED THROUGH. All reference following code would then have to mask the reference mark bit before following a reference. Hardware assist for this test can come in the form of an unused bit in references, which is ignored when virtual address computation is performed by the CPU; as well as CPU states determining the current 'phase' expected value of the reference mark bit and whether the test is needed at all. These implementations can allow the entire LVB test to be performed by a single instruction following a reference load.

The AB is used on any access of memory objects, regardless of their type. Load and store operations constitute the access of any memory object. An AB test is performed on the memory object containing data that is being loaded or stored and is triggered if the memory object is in the from-space. Similar to the LVB test, the AB test is most suitable for virtual memory protection systems, and most TLB schemes of CPUs of data processing systems can achieve this by implementing read and write protection on proper pages. An extended TLB scheme with specific protection bits and a privilege mode can make for an efficient implementation of the disclosed method. Using this extended TLB scheme, the collector pages can be tagged as such, so that the specific TLB protection bits block only the mutator threads from accessing the from-space pages. The collector threads, being tagged, are allowed to access the from-space pages and relocate memory objects.

Extra mutator workload comprising detecting and logging not marked through reference loads, detecting from space reference loads and remapping them are taken care of by the barrier handlers. Making the barrier handling work self-healing minimizes the effects of extra mutator workload. A LVB handler stores the trigger-modified reference back to the source memory location from which it was loaded. These self-healing actions ensure that any heap memory location will trigger at most one barrier event in any single mutator thread, and likely no more than one barrier event across all mutator threads combined.

The actual execution time of a complete Mark-remap or Relocation phase is not performance critical because of the high degree of mutator concurrency and the self-minimization of the extra mutator workload during all phases of the disclosed method,. Given proper barrier support, either phase can be executed without significantly degrading the mutator performance. The only absolute performance driver for completing either phase is the need to make the disclosed method progress at a sustained rate high enough to accommodate the allocation of new objects in the collected heap space. The relocation phase can be arbitrarily throttled to spread the relocation compute drain and reduce relocation and remapping in cases where the mutator is heavily degraded due to sudden relocation of a substantial number of objects. The Mark-remap phase can be similarly throttled to spread its compute drain.

Further Embodiments

In a further embodiment of the invention, memory objects have multiple mark bits instead of one mark bit. The value of LIVE increments by one with each iteration. Therefore, if the value of LIVE is '0' before the start of the first iteration, then the value of LIVE is '1' before the start of the second iteration, '2' before the third, and so on. If there are N mark bits for every memory object, then the value of LIVE can be a maximum of two raised to the power of N (2^N). Upon reaching the maximum, the value of LIVE is rest to zero before the start of the next iteration. In this embodiment, for any iteration, any value of the mark bit, other than the current LIVE value, is considered as DEAD. In this embodiment, the relocation is carried out as described earlier.

In another embodiment of the disclosed invention, the from-space is formed at the start of the Relocation phase itself by using page population statistics. In this embodiment, formation of from-space pages temporally occurs closer to the memory being released for further allocation. This makes it easier to predict when garbage collection should be done, and how much memory needs to be freed in an iteration of the algorithm. However, the page population statistics generated in the Mark-remap phase are an optimistic count of the memory that would be freed if a page were relocated. Hence, the garbage collection process is less deterministic as to how much free memory would be produced by a traversal. The formation of from-space pages in this embodiment may also result in some unreachable objects being marked LIVE during the relocation phase. Thus, those objects would be relocated even though they are dead. The percentage of relocated dead objects might be around 1/(2^N). If N is large enough, it could be more efficient to relocate some dead objects instead of sweeping the candidate pages and setting all the object mark values.

Advantages

The disclosed method caters to the need for memory management arising out of dynamic changes. The disclosed method is highly concurrent with the execution of the program. Both the phases of the method do not need any stop-the-world pauses in the mutator execution. Both phases allow for highly concurrent mutator execution to proceed in parallel with the disclosed method. Synchronization of the collector with individual mutator threads is minimized, and workload imposed on mutator threads by the disclosed method is both minimal and self-healing.

The collector tracks known dead memory object space counts in heap pages, and can calculate an accurate lower-bound prediction of the amount of space that will be collected in a single iteration of the disclosed method. The disclosed method, therefore, can provide a lower bound on the amount of free memory that can be recovered from the heap in an iteration of the disclosed method. Given a required amount of freed memory, the disclosed method can be performed for a calculated number of iterations that will guarantee freeing the required amount of memory, but minimize mutator perturbation by avoiding the freeing up of extra memory objects. The disclosed method can thus be used to self pace freeing up rate to match allocation rate without requiring extra allocation efforts.

The disclosed method reclaims free memory in contiguous, large page size blocks. It incrementally de-fragments and compacts the live objects in the collected heap space in the process. Allocation of new objects in the collected space can be done with highly efficient and scalable mechanisms that make use of the contiguous nature of freed memory.

The disclosed method does not use a sweep phase, and its computation drain is linear to the size of the live object working-set, regardless of the heap size. This allows the collector to use arbitrarily large heap sizes for increased efficiencies without increasing the compute drain and mutator perturbation during iterations of the disclosed method.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method of ensuring garbage collector processing, comprising:

reading a pointer to an object located in a memory space;

maintaining a mutator invariant to ensure that concurrence errors due to concurrent operation of a garbage collector and a mutator thread are avoided, including by determining whether the pointer has been marked through or whether it has been logged for later marking.

2. A method as recited in claim 1, wherein the pointer is associated with a metadata used at least in part to determine whether the pointer is a garbage collector processed pointer.

3. A method as recited in claim 2, wherein the metadata is a portion of the pointer.

4. A method as recited in claim 1, further comprising logging the object for later marking.

5. A method as recited in claim 4, wherein the garbage collector is only notified when the object has not already been notified to the garbage collector.

6. A method as recited in claim 1, wherein a mutator invariant prevents accessing at least a portion of the memory space being relocated or remapped.

7. A method as recited in claim 6, wherein the mutator invariant is associated with a read barrier using a Translation Look-aside Buffer (TLB) virtual memory protection.

8. A method as recited in claim 6, wherein the mutator invariant is associated with a read barrier using a software conditional test of one or more bits in a virtual memory address.

9. A method as recited in claim 1, wherein an access barrier is associated with a portion of the memory space being relocated or remapped.

10. A method as recited in claim 1, wherein a mutator invariant prevents loading references that have not been garbage collection processed or have not been specified for later garbage collection processing.

11. A method as recited in claim 1, further comprising determining a recursive level of the pointer; and processing the pointer for later traversal when the recursive level reaches a maximum recursive level.

12. A method as recited in claim 1, wherein in one garbage collection iteration a metadata value associated with marked through references is different from a metadata value associated with marked through references from a previous garbage collection iteration.

13. A method as recited in claim 12, wherein a metadata value associated with garbage collector processed pointers cycles amongst two or more values; and a metadata value associated with live pointers cycles amongst two or more values.

14. A method of performing a garbage collection iteration, comprising:

traversing memory, wherein traversing includes remapping at least one reference, if any, associated with at least one object relocated in a previous garbage collection iteration;

identifying at least a portion of the memory from which one or more objects at may be relocated, wherein at least a part of the one or more objects resides in the portion; and in the event that the portion includes at least one live object, relocating at least one of said one or more objects residing at least in part in the portion.

15. A method as recited in claim 14, further comprising associating with a memory location in the identified portion a forwarding reference to the relocated object.

16. A method as recited in claim 14, wherein the portion is at least one memory page.

17. A method as recited in claim 14, wherein a memory page associated with at least one object relocated in a current garbage collection iteration is freed after all live objects located in the memory page have been relocated.

18. A method as recited in claim 14, wherein traversing the memory includes indicating an object reference as traversed.

19. A method as recited in claim 14, wherein indicating includes accessing one or more pointer metadata bits.

20. A method as recited in claim 14, wherein traversing the memory includes indicating objects as not garbage.

21. A method as recited in claim 14, further comprising notifying at least one mutator thread of a start of the garbage collection iteration.

22. A method as recited in claim 21, wherein notifying includes one or more of the following: invoking invalidation of one or more registers, invoking invalidation of one or more entries in a stack, specifying a marker value associated with a live object, specifying a marker value associated with a traversed object reference, using a signaling mechanism, using a notification mechanism, using cooperative polling, and setting a flag associated with a thread safe-point.

23. A method as recited in claim 14, wherein traversing the memory includes determining one or more of the following: the number of live memory objects associated with at least a portion of the memory, and the total memory size of the live memory objects associated with at least a portion of the memory.

24. A method as recited in claim 14, wherein the identified portion is associated with one or more of the following: a memory page with the least number of live objects, and a memory page with the smallest amount of live memory.

25. A method as recited in claim 14, wherein a mutator invariant prevents loading references that may bypass memory traversal.

26. A method as recited in claim 14, wherein a mutator invariant prevents loading one or more references that are associated with the identified portion of memory.

27. A method as recited in claim 14, wherein an access barrier is associated with the identified portion of memory.

28. A method as recited in claim 14, wherein a mutator invariant prevents loading references that have not been traversed or have not been specified for later traversal.

29. A method as recited in claim 14, wherein traversing the memory includes detecting circular reference traversal.

30. A system for ensuring garbage collector processing, comprising:

a processor configured to:

read a pointer to an object located in a memory space;

maintain a mutator invariant to ensure that concurrence errors due to concurrent operation of a garbage collector and a mutator thread are avoided, including by determining whether the pointer has been marked through or whether it has been logged for later marking; and a memory coupled to the processor and configured to provide the processor with data.

31. A system as recited in claim 30, wherein at least a portion of the pointer includes a metadata used at least in part to determine whether the pointer is a garbage collector processed pointer.

32. A system as recited in claim 30, wherein a mutator invariant prevents accessing at least a portion of the memory space being relocated or remapped.

33. A computer program product for ensuring garbage collector processing, the computer program product being embodied in a computer readable storage medium and comprising computer instructions for:

reading a pointer to an object located in a memory space;

maintaining a mutator invariant to ensure that concurrence errors due to concurrent operation of a garbage collector and a mutator thread are avoided, including by determining whether the pointer has been marked through or whether it has been logged for later marking.

34. A computer program product as recited in claim 33, wherein at least a portion of the pointer includes a metadata used at least in part to determine whether the pointer is a garbage collector processed pointer.

35. A computer program product as recited in claim 33, wherein a mutator invariant prevents accessing at least a portion of the memory space being relocated or remapped.

* * * * *